A. HOAR.
DEPTH CONTROL FOR SUBMARINES.
APPLICATION FILED MAY 21, 1915. RENEWED SEPT. 18, 1920.
1,373,329.
Patented Mar. 29, 1921.
2 SHEETS—SHEET 1.
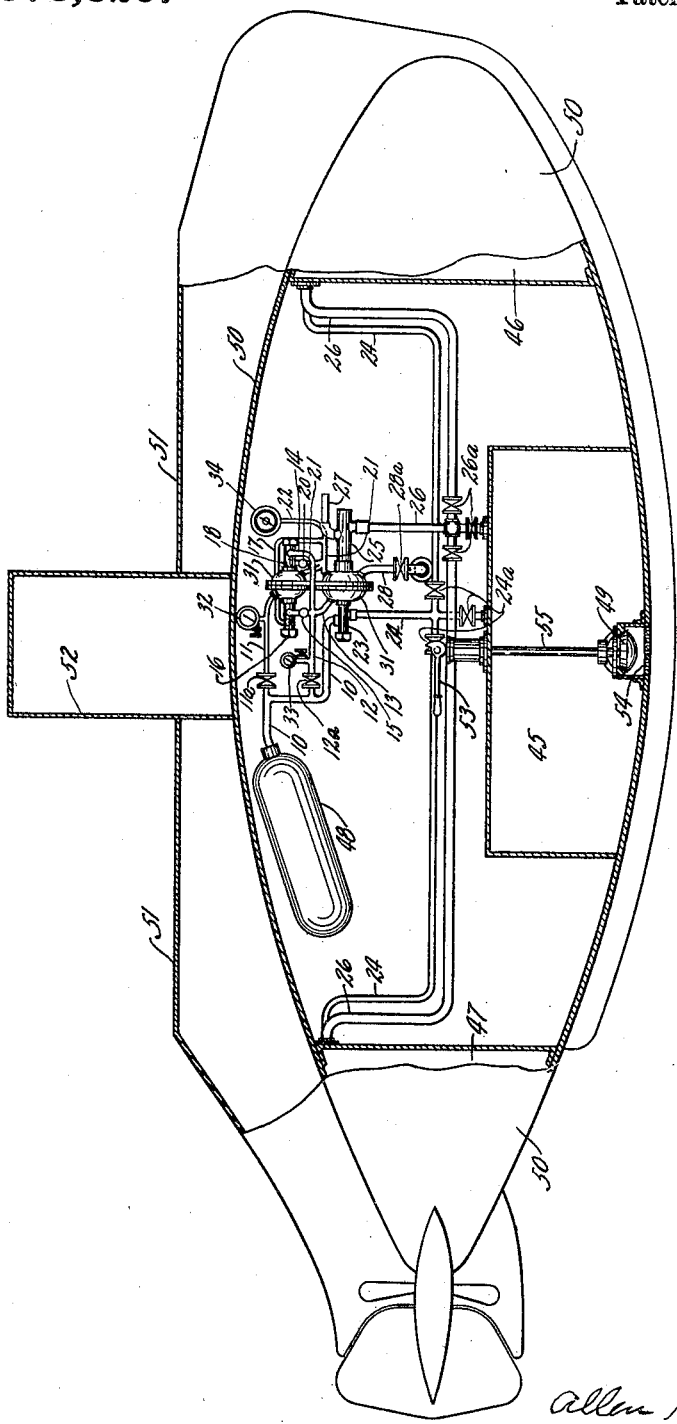

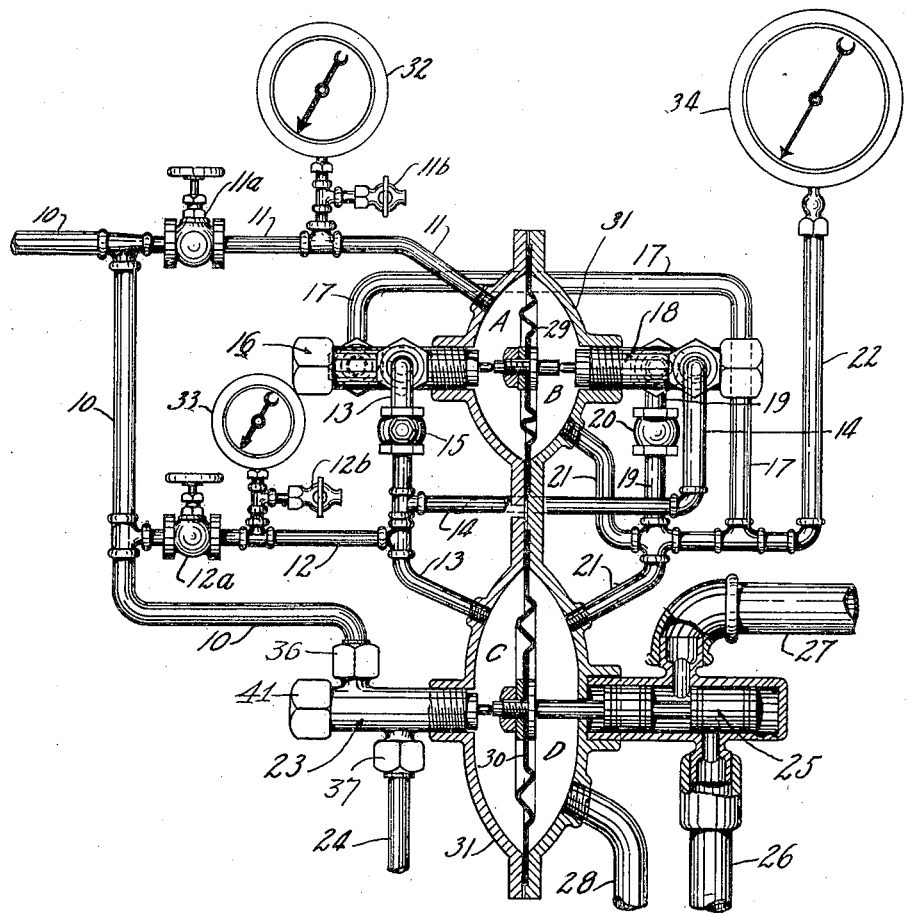

UNITED STATES PATENT OFFICE.

ALLEN HOAR, OF LONG BEACH, CALIFORNIA, ASSIGNOR, BY MESNE ASSIGNMENTS, TO L. A. SUBMARINE BOAT COMPANY, OF LONG BEACH, CALIFORNIA.

DEPTH CONTROL FOR SUBMARINES.

1,373,329.   Specification of Letters Patent.   Patented Mar. 29, 1921.

Application filed May 21, 1915, Serial No. 29,556. Renewed September 18, 1920. Serial No. 411,263.

*To all whom it may concern:*

Be it known that I, ALLEN HOAR, a citizen of the United States, residing at Long Beach, in the county of Los Angeles and State of California, have invented certain new and useful Improvements in Depth Control for Submarines, of which the following is a specification.

My invention relates to submarine boats, and more particularly to means for the automatic control of the depth of submergence of the same. Heretofore there have been a number of forms of automatic devices for controlling the depth of submergence, the same employing small auxiliary adjusting and compensating tanks, and my invention has for its primary object to obviate the necessity for these small auxiliary tanks by being operated in direct connection with the main ballast system.

My invention presents certain novel details of construction and operation as will be hereinafter more definitely pointed out and claimed, reference being had to the accompanying drawings, in which:—

Figure 1 is a longitudinal view of a submarine, partly in section, illustrating the method of installation and connection of my invention.

Fig. 2 is an enlarged detail view, partly in section, of my improved system.

Fig. 3 is a detail sectional view of the air valve.

Fig. 4 is a sectional view of the check-valves employed.

Similar numerals of reference denote corresponding parts in the several views.

In the said drawings, the reference numeral 50 indicates the hull of a submarine, 51 the superstructure and 52 the conning tower. 45, 46 and 47 indicate the main ballast tanks. The main flooding valve is indicated at 49, the same being operated by the rod 55 and the lever 53 and protected by the screen 54. At 48 is a fluid pressure reservoir. Valves $26^a$ are vent valves leading to the various tanks, valves $24^a$ are fluid pressure valves to the same, and valve $28^a$ is a sea cock in the sea pressure diaphragm line.

As shown in detail in Fig. 2, 29 is a predetermining diaphragm, and 30 is a main sea pressure diaphragm. Valve 25 is a piston vent valve, and valve 23, shown in detail in Fig. 3, is a fluid pressure valve, both leading to the main ballast tanks 45, 46 and 47, through pipes 26 and 24, respectively. Pipe 10 is a fluid pressure supply pipe leading from a fluid pressure reservoir 48. Valves 16 and 18 are spring operated needle by-pass valves similar to valve 23, and valves $11^b$ and $12^b$ are relief valves. Gage 32 is a predetermining depth gage for registering the pressure in the chamber A, gage 33 is an initial starting pressure gage, and gage 34 is the main depth gage for registering the external sea pressure.

In Fig. 3, 23 indicates the main air blow valve and 36 the pressure inlet communicating with pipe 10, and 37 the discharge outlet of the same, communicating with pipe 24. A compression spring 38 holds the valve 35 to its seat, and 39 is a push rod for opening the valve and allowing the fluid pressure to pass through. 40 is a ground joint cap for making an air tight joint, and 41 is a screw cap to hold the ground joint cap 40 to its seat. 42 is a packing space and 43 a packing gland for preventing the fluid pressure from leaking around rod 39.

Fig. 4 is a detail of the ball check valve 20 of which 44 is the ball valve.

To submerge the vessel by means of this device, the operation is as follows:—Fluid pressure is first turned into the chamber A from tank 48 by means of pipe 10, valve $11^a$ and pipe 11, until a pressure corresponding to the desired depth of submergence is registered on the dial of the gage 32. This operation forces the diaphragm 29 toward the chamber B, pressing against the stem of the valve 18 and forcing it open, thus establishing free communication from chambers B and D to chamber C, through pipes 14 and 13, but not reversely, said reverse action being stopped by the ball check valve 20 in pipe 19. An initial starting pressure of about eight pounds is then turned into the chamber C by means of the valve $12^a$ and the piping 12 and 13. The pressure admitted to this chamber forces the diaphragm 30 toward the chamber D and opens the tank vent valve 25, allowing the air contained in the ballast tank 45 or 46 and 47, according to which of the vent valves $26^a$ have first been opened, to escape through the pipes 26 and 27, and thereby flooding the tank or tanks, it being understood that the main flooding valve 49 has first been opened. When the ballast tank has been vented sufficiently to allow enough water to enter, causing the vessel to sink until the pressure in the chamber D has become equal to the pressure in the chamber C, or has become greater, the vent valve 25 will close, and the pressure in chamber D is passed through pipes 21 and 19, check valve 20, which is now opened by the excess in pressure on the underside, by-pass valve 18, and through pipes 14 and 13 into chamber C, which will equalize the pressures in chambers C, D and B, the chamber B being always open to chamber D through the clear passage afforded by pipe 21. The diaphragm 30 now being in a neutral position, both the valves 23 and 25 are closed. As the pressure in chamber B has approached the pressure in chamber A the valve 18 has been closing, and before the pressure in B has reached that in A the valve 18 has closed, cutting off the passage between C and D. Now as the pressure in these two chambers was equalized at the point of cut-off, any increase in the pressure in chamber D due to greater submergence will tend to open the fluid pressure valve 23, and supply pressure through the pipe 24 to the ballast tank or tanks, forcing out the water and causing the vessel to rise. When the pressure in chamber B becomes greater than that in chamber A, the by-pass valve 16 is opened, affording a free passage, through pipes 13, 17 and 21, from chamber C to chambers B and D, but not reversely, the check valve 15 preventing such reverse movement. Fluid pressure valve 23 has been feeding pressure to the tanks meanwhile displacing the water until the vessel is raised sufficiently for the pressure in chamber D to become lower than that in C. The excess of pressure in C then raises the ball check 15 and the pressure passes through into B and D, again equalizing them. This operation is repeated until the pressure in chambers A, B, C and D are caught and remain equal. The speed and delicacy of operation of the diaphragms and valves, and the inertia of the vessel from descent to ascent accomplish a prompt equalization in all chambers, and the vessel will then remain at the predetermined depth until the pressure in chamber A is changed, or it is desired to come to the surface by releasing the pressure in A through the relief valve 11$^b$.

My invention is extremely sensitive in operation and will control the depth of submergence to such a fineness that the vessel will not vary six inches from the predetermined depth. It is connected by suitable means of piping and stop valves to the sea, the main ballast system, and a fluid pressure line, and by its use the vessel is made self compensating for any difference in the density of the water of flotation or for any difference in weights on board. It also acts as a safety device, preventing the vessel from submerging, by blowing all ballast tanks, unless it is intended to submerge and the device put in operation by means of the predetermining and starting valves.

Having thus described my invention, what I claim as new and desire to secure by Letters Patent, is:—

1. In a submarine, in combination, a hull having ballast compartments, flooding and blowing connections with said compartments, a compressed air supply for providing pressure to blow said compartments, and means set by pressure in said supply for controlling the depth of submergence, said means consisting of opposed pressure diaphragms, one constituting the depth control, and the other a control for the inlet and escape of compressed air and the sea water, and automatically closing valves interposed between said diaphragms for positively interrupting communication under certain pressure conditions.

2. In a submarine, in combination, a hull having ballast compartments, flooding and blowing connections with said compartments, a compressed air supply for providing pressure to blow said compartments, and means set by the pressure in said supply for controlling the depth of submergence, said means consisting of opposed pressure diaphragms, one constituting the depth control, and the other a control for the inlet and escape of compressed air and the sea water, said depth control diaphragm adapted to open automatically closing valves for establishing communication upon opposite sides of the other diaphragm, and said latter diaphragm adapted alternately to open and close vents for the ballast compartment, and connections between the air supply and said compartments.

In testimony whereof I have hereunto set my hand this 6th day of May, 1915.

ALLEN HOAR.